United States Patent [19]
Kowalchuk

[11] Patent Number: 5,453,132
[45] Date of Patent: Sep. 26, 1995

[54] METHOD FOR CLEANING OPTICAL SURFACES

[75] Inventor: Kevin P. Kowalchuk, Oakville, Canada

[73] Assignee: Imax Corporation, Toronto, Canada

[21] Appl. No.: 91,934

[22] Filed: Jul. 14, 1993

[51] Int. Cl.[6] ................ B08B 5/00; B08B 5/04; B08B 3/04
[52] U.S. Cl. .................. 134/21; 134/37; 134/42
[58] Field of Search ................. 134/37, 21, 42

[56] References Cited

U.S. PATENT DOCUMENTS

| | | | |
|---|---|---|---|
| 4,026,701 | 5/1977 | Till et al. | 134/21 |
| 4,470,248 | 4/1988 | Thro et al. | 134/21 |
| 4,691,725 | 9/1987 | Parisi | 134/1 |
| 4,956,024 | 9/1990 | Dean et al. | 134/37 |
| 5,063,413 | 11/1991 | Domoto et al. | 134/21 |
| 5,143,101 | 9/1992 | Mor | 134/58 R |
| 5,279,674 | 1/1994 | Ohta et al. | 134/42 |

FOREIGN PATENT DOCUMENTS

| | | |
|---|---|---|
| 0223084 | 5/1987 | European Pat. Off. . |
| 4132138 | 2/1992 | Germany . |
| WO91/11694 | 8/1991 | WIPO . |

OTHER PUBLICATIONS

Vol. 16, No. 163 (P-1341) 21 Apr. 1992 & JP,A,04012381 (Ricoh Co. Ltd.) 16 Jan. 1992—see abstract.
Vol. 13, No. 17 (P0813) 17 Jan. 1989 & JP,A,63 221 318 (Aisin Seiki Co. Ltd.) 14 Sep. 1988—see abstract.
Vol. 15, No. 388 (C-872) 2 Oct. 1991 & JP,A,03 157 174 (Mita Ind. Co. Ltd.) 5 Jul. 1991—see abstract.
Vol. 11, No. 38 (C-401) (2485) 4 Feb. 1987 & JP,A,61 204 386 (Naniwa Seitei KK) 10 Sep. 1986—see abstract.
Research Disclosure, No. 335, Mar. 1992, Emsworth GB, p. 202, XP000301104 'non-contact/Non-destructive material remover'.

Primary Examiner—Richard O. Dean
Assistant Examiner—Zeinab El-Arini
Attorney, Agent, or Firm—Bereskin & Parr

[57] ABSTRACT

A method for cleaning an optical surface such as an eyeglass lens involves the use of a cleaning head having a contact seal for engaging around the perimeter of the surface to be cleaned. The cleaning head defines a shallow cleaning cavity which includes the optical surface and the surface is cleaned by generating in the cavity a high velocity air flow across the surface, introducing a cleaning fluid into the air flow so as to scrub the surface, and terminating the introduction of cleaning fluid while maintaining the air flow to remove any residual cleaning fluid. A particular application of the method to simultaneously clean all four surfaces of the eyeglass lenses of a pair of 3-D glasses is also disclosed.

7 Claims, 2 Drawing Sheets

METHOD FOR CLEANING OPTICAL SURFACES

FIELD OF THE INVENTION

This invention relates generally to a method and apparatus for cleaning soiled optical surfaces using vacuum means. More specifically (but not exclusively), the invention deals with a method and apparatus for cleaning soiled optical lens surfaces of 3-D liquid crystal eyeglasses used in the presentation of high quality stereoscopic motion pictures.

BACKGROUND OF THE INVENTION

There are several commonly known methods of displaying 3-D motion pictures all of them are stereoscopic; that is they involve coding and display of separate left and right eye images in such a manner that only the proper eye can see the corresponding images. In the anaglyph method, different colour filters are used. Typically, the left eye and right eye images are projected simultaneously but in different colours, say red and blue respectively, and the viewer wears a pair of glasses fitted with red and blue filters arranged to appropriately separate the images.

Another method of image separation involves the use of mutually extinguishing polarizing filters. The filters are placed in front of left and right eye projectors with their polarizing axes at 90 degrees to each other. Viewers wear eyeglasses with polarizing filters arranged in the same orientation as the filters on the projectors. The left and right eye images appear on the screen at the same time, but only the left eye polarized light is transmitted through the left eye lens of the eyeglasses and only the right eye polarized light is transmitted through the right eye lens.

A third known method involves time multiplexing of left and right eye images. Left and right eye images are presented alternately so that there is only one eye image on the screen at any one moment in time. Viewers wear glasses which alternately block the view of one eye so that only the correct image will be seen by each eye. The glasses typically have electro-optic liquid crystal shutters and are powered by batteries. Alternate-eye 3-D glasses are superior in overall performance to anaglyph or polarizer glasses and they allow spectacular full colour 3-D motion pictures to be projected onto a dome shaped screen. Some of the details of such a 3-D motion picture system are described in U.S. Pat. Nos. 4,424,529 (Roese et al.), 4,957,361 (Shaw), 4,966,454 (Toporkiewicz), and 5,002,387 (Baljet et al.).

One major disadvantage of using liquid crystal eyeglasses in a motion picture theatre is that they are expensive to manufacture. It is imperative that each pair be reused many times to offset this expense. This is not the case for anaglyph or polarizer type glasses which are inexpensive and can be discarded after a few uses. Typically, a pair of liquid crystal eyeglasses must last several thousand uses. After each use, it is desirable to have the glasses cleaned to remove fingerprints from the lenses and makeup and hair from other parts that come into contact with the skin of a user. The process of cleaning the glasses can be hazardous to the glasses because of the potential for cleaning fluid to penetrate into the glasses and damage the driving electronics and/or the power source.

One known method for cleaning large numbers of liquid crystal glasses in a systematic manner involves teams of people to wash the lenses by hand. To ensure a smooth and efficient process the glasses are placed on a conveyor belt which brings them to a cleaning staff on either side of the belt at a preset frequency. Although cleaning by this method is effective and safe for the inner electronics it is very labour and material intensive and hence expensive. A further disadvantage is that substantial floor space is required to house the conveyor belt and cleaning staff, and this is usually scarce in specialty motion picture theatres.

Another known method for washing large numbers of glasses is to wash them in a batch washing machine similar to a bar-glass dishwasher. For this method to be successful it is essential that the glasses be completely sealed and waterproof. The sealed glasses are placed in racks which are carried by a conveyor belt through several washing stations, including wash, rinse and dry stations, of an aqueous washing machine. This method is not suitable because it is difficult (and expensive) to seal the glasses to such a degree that they could survive thousands of washings.

DESCRIPTION OF RELATED ART

U.S. Pat. No. 4,026,701 to Till et al. discloses an apparatus and process for cleaning the surface of an electrostatic imaging member. A device provides for a gas flow to impinge on a soiled surface and for a suction flow to remove the gas and the residue removed by the gas. A cleaning shoe is positioned as close as possible to the soiled surface in order to increase the velocity of the gas flow. At the same time, the gas flow and suction are carefully balanced so that the cleaning head floats above the soiled surface on a gas bearing. The gap between the soiled surface and at the cleaning head surface is maintained at about 0.003 to 0.015 inches which allows the effective removal of particles of about 0.003 to 0.010 inch size. Excellent cleaning is reported with a 0.005 inch gap and a total air flow of 7 cubic feet per minute.

U.S. Pat. No. 4,956,025 to Dean et al. discloses a device and method for non-contact cleaning of very small particles (of the order of 1–2 microns) from semiconductor surfaces. The device uses a combination of gas pressure and vacuum to create and maintain high velocity flow to dislodge and remove contaminating particles. In addition, the pressure and vacuum combination creates a planar gas bearing which forms a self-regulating gap of the order of 20–50 microns between a cleaning head and a soiled surface. The device includes a circular relief groove and shallow counter bores to create eddy and turbulence effects in the gas flow to aid in the removal of particles.

U.S. Pat. No. 5,063,413 to Domoto et al. discloses a method and apparatus for removing excess liquid from an image receptor. Excess liquid is removed by a shearing action resulting from a high velocity air parallel to the surface of the image receptor. The air flow can be driven by pulling a vacuum which collects the excess liquid to prevent its release into the environment and allow its reuse.

It is an object of this invention then to describe a cleaning method and apparatus suitable for washing large numbers of liquid crystal 3-D eyeglasses in a timely and safe manner, with a high probability that the eyeglasses will survive thousands of washings. It is a further object of this invention to describe a method and apparatus for cleaning the lenses of liquid crystal 3-D eyeglasses without exposing the electronics and power supply of the glasses to moisture.

SUMMARY OF THE INVENTION

According to the invention there is provided a method and apparatus for cleaning an optical surface. The method involves the steps of:

providing a shallow, sealed cleaning cavity which includes said optical surface;

generating in said cavity, a high velocity air flow across said surface;

introducing a cleaning fluid into the high velocity air flow upstream of said surface; and, terminating the introduction of cleaning fluid while maintaining said air flow to remove any residual cleaning fluid.

The apparatus provided by the invention includes a cleaning head having a front face defined by a seal for sealing contact with a surface to be cleaned, the head being adapted to define with said surface a shallow cleaning cavity the surface. Means is provided for generating in the cavity a high velocity air flow across the surface. The apparatus also includes means for introducing a cleaning fluid into the high velocity air flow upstream of the surface.

While the related prior art recognizes that effective cleaning can result from a high velocity air flow over surface produced by a combination of pressure and vacuum the art does not recognize the advantages of adding a flow of cleaning fluid to a high velocity gas flow for rapid cleaning and for then abruptly stopping the flow of said cleaning fluid to allow the continuing gas flow to remove residual cleaning fluid and thus dry the surface. The prior art also does not recognize the advantage of providing a circumferential seal which contains both the gas and cleaning fluid and prevents fluid from penetrating and damaging electronics associated with the surface to be cleaned.

DETAILED DESCRIPTION OF PREFERRED EMBODIMENTS

Figure 1:
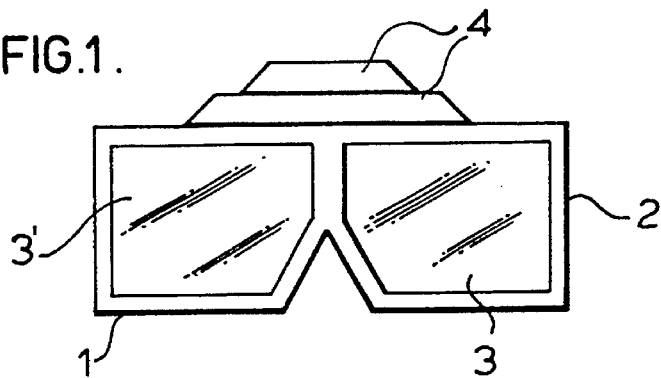
FIG. 1 is the front view of a pair of 3-D liquid crystal glasses suitable for cleaning by the method and apparatus of the invention.

FIG. 1 is a simplified front view of a pair of 3-D liquid crystal eyeglasses 1 to be cleaned by the method and apparatus of the invention. The eyeglasses include a frame 2 which houses two liquid crystal shutter lenses 3 and 3'. Attached to frame 2 are secondary assemblies 4 which house driving circuitry and a power supply for the shutters.

Figure 2:
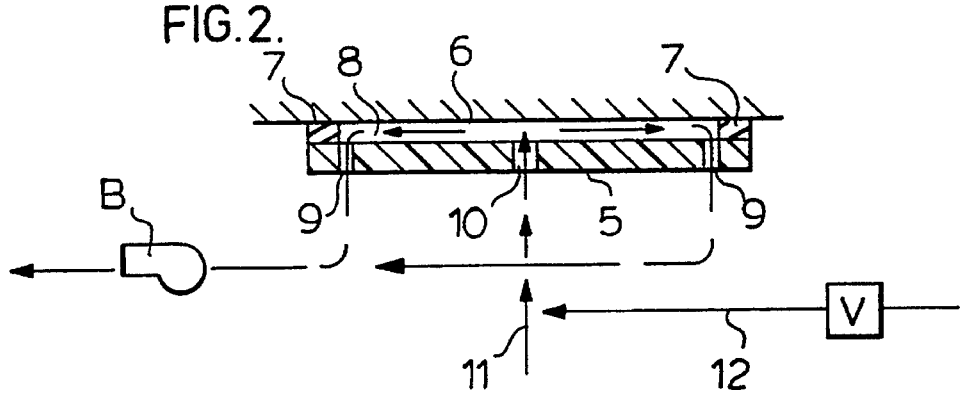
FIG. 2 is a schematic illustration of the method of the invention.

Referring now to FIG. 2, a method which allows rapid and splash-free cleaning of an optical surface is schematically depicted. A cleaning head 5 is urged into position against a soiled optical surface 6 in such a manner that a liquid-tight seal is formed between a circumferential edge seal 7 of the cleaning head and surface 6. A shallow cavity 8 is thus defined by the surface 6, the inner face of cleaning head 5 and the inner edges of circumferential seal 7. The thickness (depth) of cavity 8 is defined in part by the deformation characteristics of the circumferential seal and by the amount of force applied in urging the cleaning head against the soiled surface. This thickness is maintained at an optimal amount which ensures that when an air flow is introduced into cavity 8 a high velocity is achieved over the soiled surface. Contaminants on soiled surface 6 are removed by a shearing force resulting from the rapidly moving air.

In practice, it has been found that effective cleaning is achieved when a thickness in the range of 0.020 to 0.030 inches is used with an air flow of about 3 cubic feet per minute. In the illustrated embodiment, the air flow is generated by vacuum means pulling air out of cavity 8 through a plurality of exit ports 9 around the outer edges of the surface to be cleaned. In FIG. 2, the vacuum means is denoted B and is represented by a conventional air blower.

In use, air is drawn into cavity 8 through a central entry port 10. Cleaning fluid is introduced into the air flow 11 upstream of cavity 8 to assist in the removal of contaminants by chemical as well as mechanical (shear) means. As the high velocity air/fluid mixture travels over surface 6, contaminants are removed and carried away through exit ports 9. After a brief period of time, injection of cleaning fluid into the entry air flow is stopped and any residual cleaning fluid in cavity 8 is removed by continuing the air flow for a brief "drying" period. The air flow is then terminated and cleaning head 5 is removed from surface 6, completing the cleaning cycle.

In FIG. 2, means for introducing cleaning fluid into the air flow is diagrammatically indicated by reference numeral 12. In practice, these means may comprise a simple pipe for supplying the fluid and a valve V (e.g. a solenoid valve) for controlling fluid flow in the pipe. When the valve is open, cleaning fluid is drawn from the pipe by the air flow 11. Introduction of the cleaning fluid could alternatively be performed by positively pumping the fluid into the air, although it is not believed necessary to do this.

There are many possible cleaning fluid formulations which could be used to clean the lenses of the glasses. One formulation that has been found to be particularly effective is a mixture of water and Kodak Photoflo in a 600:1 ratio.

Figure 3:
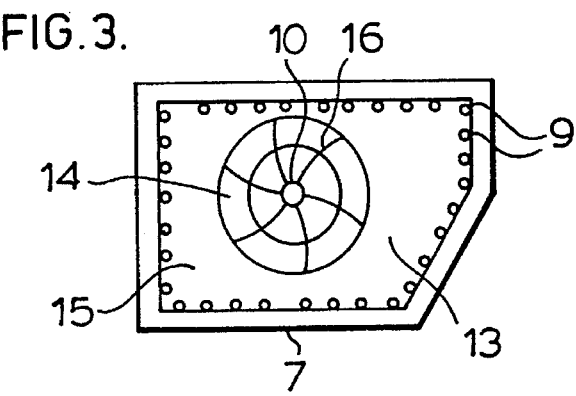
FIG. 3 is a diagrammatic elevational view of the front face of a cleaning head suitable for use in the apparatus.

FIG. 3 depicts a preferred embodiment of a cleaning head 13 as seen "face on" (i.e. in front elevation). The shape of the cleaning head is designed to couple precisely with a particular lens face of a pair of liquid crystal glasses of the type depicted in FIG. 1, by making sealing contact against the portion of the frame 2 that surrounds the lens face. Edge seal 7 extends continuously around the periphery of the cleaning head and the cleaning head has an inner surface 15 within seal 7. Air and fluid are introduced into the shallow cleaning cavity defined by seal 7, surface 15 and a parallel soiled optical surface 6 through a central entry port 10 and a surrounding annular entry channel or ring 14. Curved vanes 16 within the entry ring deflect and direct a portion of the air and fluid entering through entry ring 14 in such a manner to induce a slight swirl in the air/fluid flow within cavity 8, thereby ensuring that the cleaning flow of air and fluid completely covers the soiled surface. The air/fluid flow and removed contaminants exit through a plurality of exit ports 9 located around the periphery of the cleaning face.

Figure 4:
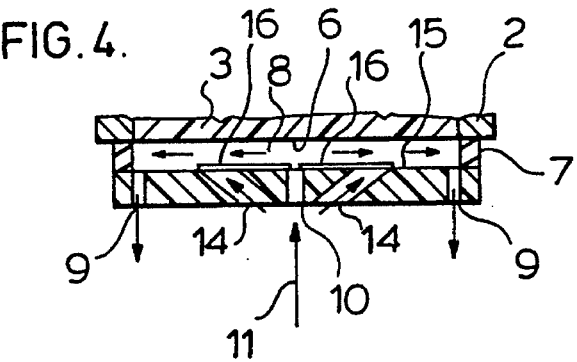
FIG. 4 is a schematic illustration of the cleaning method performed using the cleaning head depicted in FIG. 3; and, FIG. 5a, 5b and 5c are schematic plan views illustrating the sequence of operation of an apparatus according to a preferred embodiment of the invention, in which front and rear cleaning head assemblies are used to simultaneously clean front and rear surfaces of both lenses of a pair of 3-D glasses.

FIG. 4 is an edge view of the cleaning face illustrated in FIG. 2 showing how air and fluid is introduced into cavity 8. Approximately 50% of the flow is introduced through central entry port 10 and travels over surface 15. The remainder of the air/fluid flow travels through a plurality of channels defined by ring 14 and the vanes 16 and travels over surface 15. As in the embodiment of FIG. 2, the air/fluid flow is drawn by vacuum towards exit ports 9.

Figure 5A:
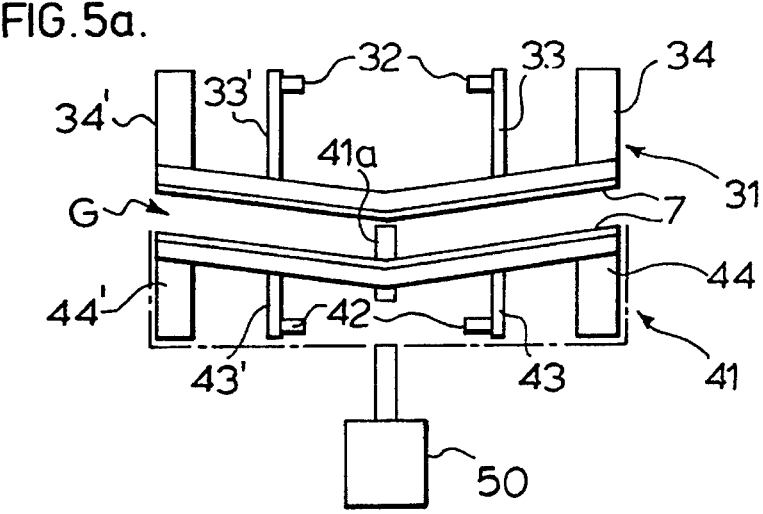

FIGS. 5a, b and c are plan views which schematically illustrate a series of sequential steps in the cleaning method of the invention as used in a preferred embodiment to simultaneously clean all four lens faces of a pair of liquid crystal glasses.

As shown, two cleaning or washing assemblies 31 and 41 each include two of the cleaning (washing) heads illustrated in FIGS. 3 and 4. The assemblies 31 and 41 are supported on a base which is provided with the necessary pneumatic, electrical and cleaning fluid connections (not shown) to supply the cleaning heads.

Figure 5B:
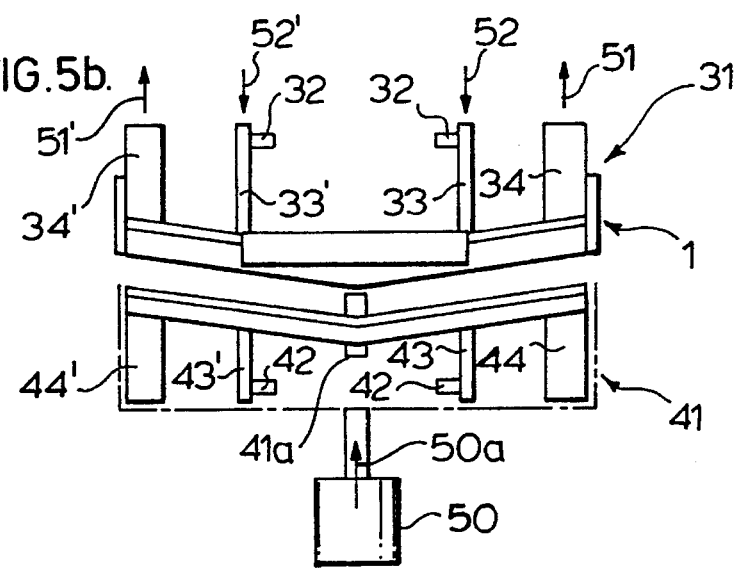

A gap G (FIG. 5a) between the two assemblies 31 and 41 allows a pair of glasses 1 to be inserted vertically downwardly between the two assemblies and located on assembly 31 as shown in FIG. 5b. Assembly 31 is immovably supported on the base, but assembly 41 is slidably mounted in a channel 41a which allows it to be driven by an air cylinder 50 towards assembly 31 with the goal of sandwiching the glasses between the two cleaning head assemblies. An infrared sensor (not shown) detects the presence of a pair of glasses when they are dropped into position and a signal is sent to a microprocessor which controls the cleaning process by sending signals at preset times to a number of actuators (not shown), including air cylinder 50.

A first signal is sent from the microprocessor to an actuator to initially apply vacuum to cleaning assembly 31 only, to ensure that the glasses are firmly seated on assembly 31. As seen in FIG. 5b, air (represented by arrows 51, 51') is drawn out of manifolds 34, 34' associated with the exit ports 9 (FIGS. 2 to 4) of each cleaning head of assembly 31, causing air to be drawn into entry tubes 33, 33' associated with the entry ports 10 of the cleaning heads. Corresponding manifolds and entry tubes for assembly 41 are indicated at 44, 44' and 43, 43' respectively. Cleaning fluid inlets on the entry tubes are indicated at 32 and 42.

Figure 5C:
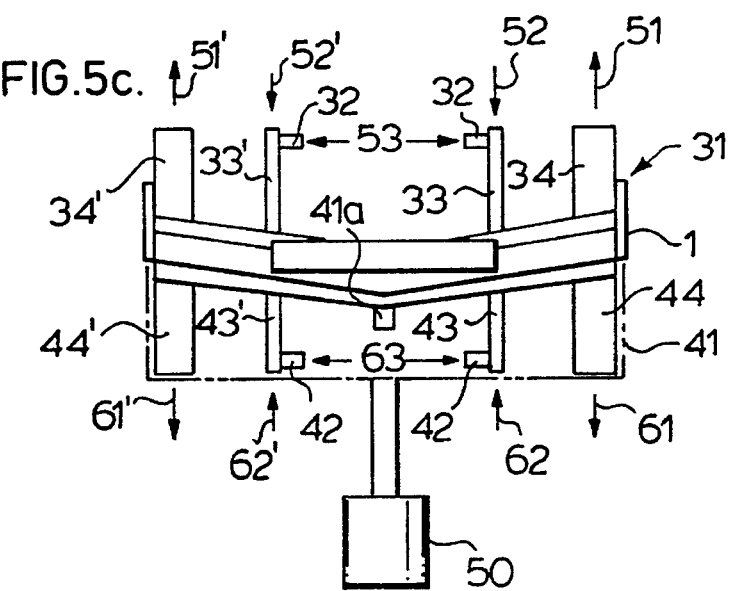

Next, a signal is sent from the microprocessor to air cylinder 50, which moves assembly 41 towards assembly 31 as indicated by arrow 50a in FIG. 5b, to the position shown in FIG. 5c. Shortly thereafter, a signal from the microprocessor to a further actuator applies vacuum to the manifolds 44, 44' of cleaning assembly 41, causing air to be drawn into entry tubes 43, 43'. In FIG. 5c, the respective air flows are indicated at 61, 61' and 62, 62'.

In each cleaning assembly, air is initially drawn from the vicinity of the inner surfaces 15 (FIG. 4) of the respective heads and from entry tubes 33, 33', 43, 43'. After a preset time, when the glasses are firmly sandwiched between assemblies 31 and 41 and an airtight seal around each lens face has been created, air is drawn completely from entry tubes 33, 33', 43, 43' resulting in a flow of air in the cleaning cavity 8 defined by each lens face, the associated cleaning head surface 15 and the compressible seal 7 surrounding the lens face.

A signal is then sent from the microprocessor to open four fluid control solenoids (not shown) causing cleaning fluid to be drawn into the air flow, as indicated by the arrows 53 and 63 in FIG. 5c. The solenoids are controlled to remain open for a brief amount of time, typically for 1–3 seconds, after which they are closed. Air continues to flow over the faces of the glasses for an additional period of time, in the range of 10–20 seconds during which any remaining cleaning fluid is removed. The overall cleaning cycle time for a pair of glasses is then in the range of 11–23 seconds and is determined by considering both cleaning effectiveness and throughput capacity.

A further signal is then sent from the microprocessor to shut off the vacuum to both cleaning assemblies. Finally a signal is sent by the microprocessor to air cylinder 50 which causes assembly 41 to retract to its original position allowing the glasses to be removed.

It will of course be understood that the preceding description relates to particular preferred embodiments of the invention and that many modifications are possible within the broad scope of the claims. Some of those modifications have been indicated and others will be apparent to a person skilled in the art.

It should also be noted that references in the present application to applications in the invention in cleaning soiled "optical surfaces" are not intended to restrict the invention to the cleaning of eyeglass lenses. For example, the invention could be applied to the cleaning of hollow lenses, e.g. projection lenses, to mirrors or even to plain glass surfaces used, for example, in optical systems such as photocopying machines.

I claim:

1. A method of cleaning an optical surface comprising the steps of:
    (a) providing a cleaning head having a front face which includes a seal shaped to circumscribe the optical surface to be cleaned;
    (b) bringing said head and surface together so that the optical surface and the cleaning head combine to form a sealed cleaning cavity;
    (c) generating in said cavity, a high velocity air flow across said optical surface;
    (d) introducing a cleaning fluid into the high velocity air flow upstream of said surface; and,
    (e) terminating the introduction of cleaning fluid while maintaining said air flow to remove any residual cleaning fluid.

2. A method as claimed in claim 1, wherein said step of generating a high velocity air flow comprises introducing air into said cavity generally in a centre region of said surface, and removing air from said cavity from a plurality of locations distributed around a perimeter region of said surface.

3. A method as claimed in claim 2, wherein said step of introducing air into said cavity is performed by introducing a portion of the air flow into said cavity through a central port, and introducing the remainder of the air flow into said cavity through an annular channel extending around said port.

4. A method as claimed in claim 3, wherein said annular channel includes a plurality of vanes that are curved in the same direction with respect to said central port so as to deflect air entering said cavity through said channel to flow in a pattern in which the air generally swirls about said central port within said cavity.

5. A method as claimed in claim 1, wherein said step of generating a high velocity air flow in said cavity is performed by drawing air from said cavity by vacuum means.

6. A method as claimed in claim 1, wherein said optical surface is a lens of a pair of eyeglasses having a frame housing a pair of said lenses, the frame extending around the perimeter of each similar lens, and wherein said cleaning head seal is shaped to seal against said frame around the perimeter of the lens to be cleaned.

7. A method as claimed in claim 6 for simultaneously cleaning both lenses of a said pair of eyeglasses, the method comprising the further steps of:

providing a pair of cleaning assemblies for cleaning respectively front and rear surfaces of the eyeglass lenses, each assembly including two said cleaning heads for simultaneously cleaning the surfaces of both lenses;

arranging said assemblies at a spacing sufficient to permit introduction of a pair of eyeglasses therebetween;

positioning a said pair of eyeglasses between said assemblies;

bringing the respective assemblies into contact with the eyeglasses so that each cleaning head seals around the frame portion of the respective lens surface to be cleaned and defines a said cleaning cavity including said surface; and, simultaneously cleaning all of said surfaces by said steps (b), (c) and (d);

separating the cleaning assemblies to permit removal of the eyeglasses.

* * * * *